3,563,047
PRODUCTION OF HIGH PURITY
OXYGEN FROM AIR

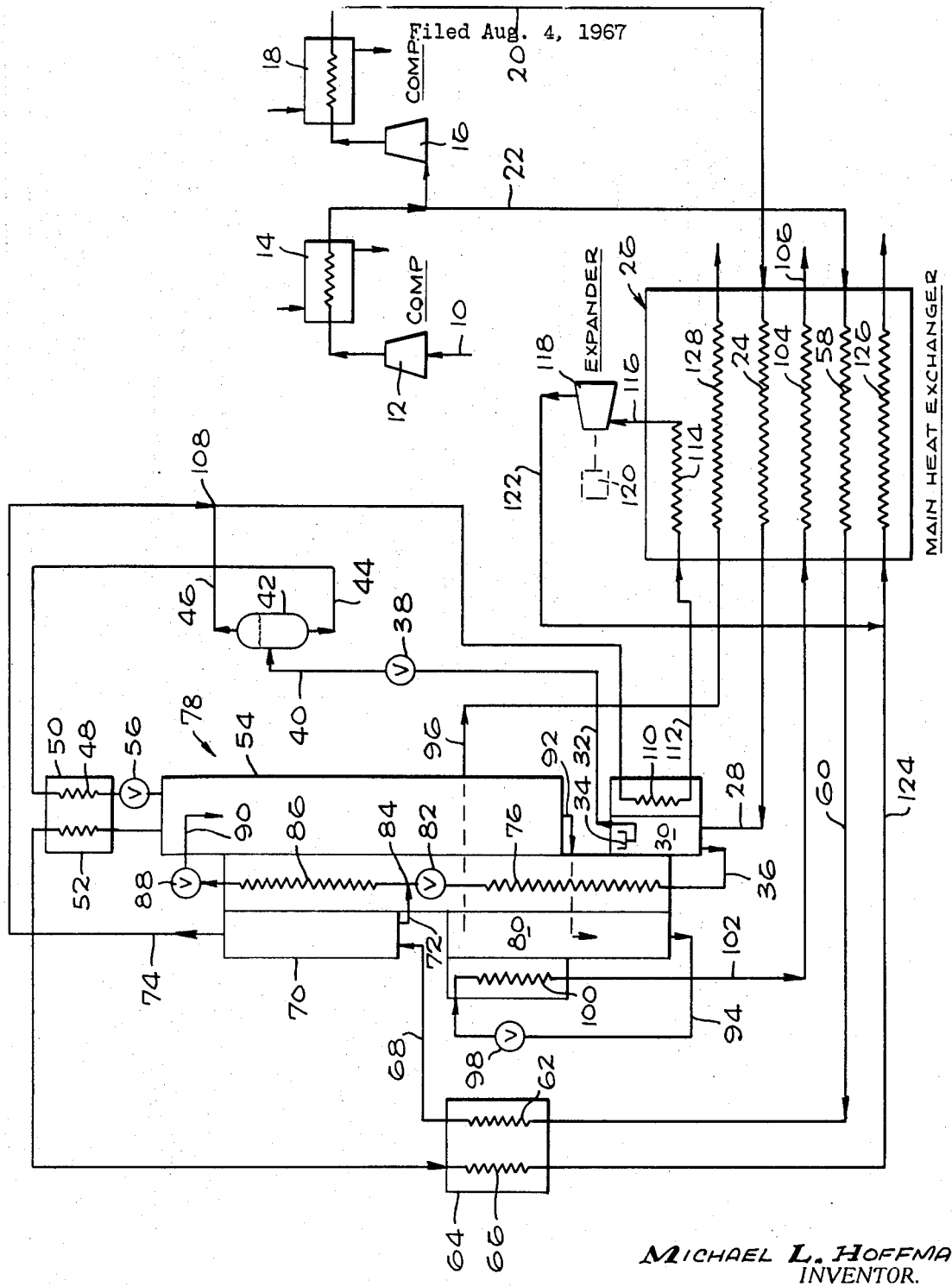

Michael L. Hoffman, Beverly Hills, Calif., assignor, by mesne assignments, to McDonnell Douglas Corporation, Santa Monica, Calif., a corporation of Maryland
Filed Aug. 4, 1967, Ser. No. 658,501
Int. Cl. F25j 3/02, 3/08, 3/04
U.S. Cl. 62—22                                                                           11 Claims

ABSTRACT OF THE DISCLOSURE

Process and system for producing high purity oxygen by air separation, which involves use of a high pressure air feed stream and an intermediate pressure air feed stream, and includes cooling both air feed streams approximately to saturation, separating the cooled high pressure air stream into liquid nitrogen and a first oxygen-rich liquid air mixture in a first separation zone, introducing a portion of said liquid nitrogen, after reducing the pressure thereof, as reflux into a main distillation zone at slightly above atmospheric pressure, separating the cooled intermediate pressure air feed stream in an intermediate pressure zone, into overhead nitrogen and a second oxygen-rich liquid air mixture, reducing the pressure of such first and second oxygen-rich liquid air mixtures, and introducing the resulting oxygen-rich liquid air mixtures as feed into the main distillation zone, withdrawing nitrogen overhead from the intermediate pressure zone, mixing same with a portion of nitrogen vapor from said first separation zone, work expanding the resulting nitrogen mixture to provide refrigeration, and passing the resulting cooled nitrogen vapor into heat exchange relation with both the first and second compressed air streams for cooling same, withdrawing crude liquid oxygen containing a minor portion of argon from the main distillation zone, separating the crude liquid oxygen in the argon separation zone, into high purity oxygen liquid and an argon-containing overhead, and vaporizing the high purity oxygen product; the main distillation zone, the high pressure and intermediate pressure separation zones, and the argon separation zone preferably being associated in heat exchange relation to provide suitable condensing and reboiling duty in each of such zones, and preferably under conditions to provide differential distillation in the main distillation zone and also in the other above-noted associated zones.

---

This invention relates to the separation of the components of an air mixture by low temperature rectification, and is particularly concerned with procedure and a system for the separation of oxygen in substantially pure form, e.g., as a gas, employing an air feed composed of a relatively high pressure feed stream and a substantial portion of an intermediate pressure air feed stream, preferably utilizing multiple separation zones which are suitably associated in heat exchange relation and employing in one or more of said zones the principles of "differential distillation."

A conventional system for oxygen production by low temperature air rectification, employs a double column and generally employs an air feed at a pressure of about 6 to 7 atmospheres. According to the present invention, it is sought to reduce the air feed pressure requirement and improve the economy of such prior art system by providing a substantial portion of the air feed at a lower or intermediate pressure.

The concept of the present invention utilizes an intermediate pressure separation or distillation zone which receives a portion of the air feed at reduced or intermediate pressure, and provides sufficient overhead nitrogen vapor which when work-expanded provides a refrigeration source for the system.

In addition to such intermediate pressure separation zone, there is also provided a high pressure stripping zone which receives the high pressure portion of the air feed and provides nitrogen overhead which is employed as reflux in the main distillation zone. Oxygen-rich liquid air which is produced and removed from the high pressure and intermediate pressure separation zones is employed as feed to the main distillation zone.

There is also provided an argon separation zone, in which crude liquid oxygen removed from the main distillation zone is separated into high purity oxygen and a vapor containing argon, nitrogen and oxygen.

Thus there is provided according to the invention a process or system for the separation of high purity oxygen from air, the steps of which comprise providing two compressed air feed streams, a first air stream being a relatively high pressure stream and a second being an intermediate pressure stream, cooling each of said compressed air feed streams approximately to their respective saturation temperatures, introducing the first compressed air stream into a first high pressure separation zone, removing high pressure nitrogen as overhead from such zone, reducing the pressure of said overhead nitrogen and introducing at least a portion of such overhead nitrogen as reflux to a main distillation zone operating at a pressure somewhat above atmospheric, introducing said second compressed air stream into a second intermediate pressure separation zone, removing nitrogen as overhead from said last-mentioned zone, work-expanding said last-mentioned nitrogen overhead, passing the resulting cooled expanded nitrogen into heat exchange relation with said compressed air feed for cooling same as aforesaid, withdrawing a first oxygen-rich liquid air mixture from said first high pressure separation zone, withdrawing a second oxygen-rich liquid air mixture from said second intermediate pressure separation zone, reducing the pressure of said first and second mixtures, introducing the resulting oxygen-rich air mixture as feed into said main distillation zone, withdrawing nitrogen overhead from said main distillation zone, withdrawing crude liquid oxygen containing a minor portion of argon from the bottom of said main distillation zone, and separating argon and removing high purity oxygen from said crude liquid oxygen in an argon separation zone.

According to preferred practice of the invention, the main distillation zone, and the high pressure, intermediate pressure and argon separation zones are suitably associated in heat exchange relation to provide the requisite condensing and reboiling duty for each of the zones. Thus for example, the high pressure separation zone can be disposed in heat exchange relation with a portion of the argon separation zone to provide condensing duty in the high pressure separation zone; the lower portion of the main distillation zone can be in heat exchange relation with the upper portion of the argon separation zone to provide condensing duty therein and reboiling duty for the main distillation zone; and the intermediate pressure separation zone can be in heat exchange relation with the upper portion of the main distillation zone to provide condensing duty therefor.

In preferred practice, although not necessary, greater efficiency is achieved by subcooling the oxygen-rich liquid air mixtures withdrawn from the high pressure and intermediate pressure separation zones prior to introduction of such mixtures as feed into the main distillation zone.

According to a preferred embodiment, the oxygen-rich liquid air removed from the high pressure separation zone can be passed in heat exchange relation with the argon separation zone and the main distillation zone, and the oxygen-rich liquid air mixture withdrawn from the intermediate pressure zone can be passed in heat exchange relation with the upper portion of the main distillation zone, for subcooling such oxygen-rich air mixtures prior to the introduction thereof as feed into the main distillation zone, such heat exchange preferably being accomplished along the length of such zones, to effect a non-adiabatic differential distillation in said zones, prior to introduction of the oxygen-rich liquid air as feed into the main distillation zone.

Also, according to a preferred embodiment of the invention, the cold nitrogen overhead withdrawn from the intermediate pressure separation zone can be brought into heat exchange relation preferably along the high pressure separation zone to provide condensing duty therein and to warm such nitrogen stream prior to work expansion thereof, and the high purity oxygen liquid withdrawn from the argon separation zone can be throttled to a somewhat lower pressure and passed in heat exchange relation along a portion of the argon separation zone to vaporize the liquid oxygen and provide additional condensing duty in such zone.

The resulting high purity oxygen vapor, the overhead nitrogen stream from the main distillation zone, and the overhead argon-containing vapor from the argon separation zone and also the work-expanded nitrogen overhead from the intermediate pressure separation zone, can be passed in heat exchange relation with the compressed air feed streams for cooling same.

The invention process and system result in a substantial economy particularly in air feed compression costs for producing high purity oxygen, thereby representing a substantial advance in the art over the conventional double column system wherein the entire air feed is at high pressure.

The invention will be more clearly understood by the description below of a preferred embodiment of the invention, taken in connection with the accompanying drawing illustrating such preferred embodiment.

Referring to the drawing, an air feed at 10 is first compressed at 12 to about 3 atmospheres, is cooled by passage through the cooler 14, and a major portion, e.g., about two-thirds of such compressed air, is further compressed at 16 to a pressure of about 6 atmospheres and is cooled by passage through the cooler 18. Thus, the initial air feed stream at 10 is compressed into two pressure streams, a first high pressure stream 20 and a second intermediate pressure stream 22, the intermediate pressure stream comprising, for example, about one-third of the air feed.

The first high pressure air feed stream 20 is cooled approximately to its saturation temperature by passage through coil 24 of a main heat exchanger 26, and the resulting compressed saturated air is then fed at 28 into the bottom of a high pressure separation column or zone 30 which is in heat transfer relation with other components of the system as described in detail hereinafter. Sufficient refrigeration is provided in separation zone 30 to permit liquid nitrogen to be withdrawn at 32 from the liquid nitrogen separator 34 in the top of column 30, and oxygen-rich liquid air, e.g., containing about 40% oxygen, to be withdrawn at 36 from the bottom of column 30.

The nitrogen stream 32 at a temperature of about 92° F. is throttled at 38 to a pressure of about 2.4 atmospheres, and a temperature of about 84° K., and is fed at 40 into a vapor-liquid separator 42 where liquid nitrogen is withdrawn at 44 from the bottom of the separator 42 and a minor amount of flash nitrogen vapor is withdrawn at 46 from the top of the separator. The liquid nitrogen at 44 is subcooled by passage through coil 48 of a heat exchanger 50 against overhead nitrogen at 52 from a main distillation column 54, and is then throttled at 56 and fed to the top of the main distillation zone 54 as reflux.

The second intermediate pressure air feed stream 22, which has been compressed to about 3 atmospheres, is passed through coil 58 of the main heat exchanger 26, and the exiting cooled compressed air stream at 60 is further cooled by passage through coil 62 of a heat exchanger 64 against overhead nitrogen at 66 from the main distillation zone, and the exiting intermediate pressure air stream at 68, cooled approximately to its saturation temperature, is fed to the bottom of an intermediate pressure separation column or zone 70. Zone 70 is positioned in heat exchange relation with the main distillation zone or column 54 and received refrigeration from such main separation zone, thus providing reflux sufficient to withdraw an oxygen-rich liquid air, e.g., containing about 45% oxygen, at 72 from the bottom of zone 70, and nitrogen vapor at 74 from the top of such zone.

The oxygen-rich liquid air at 36 withdrawn from the bottom of the high pressure separation zone 30 is passed through one or more passages 76 of the entire distillation unit 78 comprising the high and intermediate pressure separation zones 30 and 70, the main distillation column 54 and an argon separation zone 80, to subcool such oxygen-rich liquid mixture, and the subcooled liquid mixture is throttled at 82 to a pressure of about 3 atmospheres and a temperature of 89° K. The oxygen-rich liquid air mixture at 72 withdrawn from the intermediate pressure zone 70 is combined at 84 with the oxygen-rich liquid air throttled at 82, and the combined oxygen-rich air mixture is passed through one or more passages 86 of unit 78, into heat exchange relation with zone 70 and the main distillation zone 54, to further subcool such liquid mixture, and the subcooled oxygen-rich liquid air is throttled at 88 to a pressure of about 1.3 atmospheres and introduced as feed at 90 into the main distillation zone 54 operating at about 1.3 atmospheres pressure.

In the main distillation zone or fractionating column 54, the oxygen-rich air mixture entering at 90 is permitted to expand in the column, the nitrogen liquid which descends from the top of the column as reflux becoming richer in oxygen and leaner in nitrogen as it proceeds towards the bottom of the column, while the stream of oxygen vapor which rises from the bottom of the column becomes richer in nitrogen as it rises toward the top of the column. By addition of heat to the lower portion of the column by the subcooling of the oxygen-rich liquid mixture in passages 76 and the condensing duty of the upper portion of the argon separation zone 80, and the removal of heat from the upper portion of the column by the condensing duty provided by the intermediate pressure zone 70 and the oxygen-rich liquid mixture in passages 86, the descending liquid and ascending vapor in the column are brought into equilibrium throughout the height of the column, effected by a non-adiabatic differential distillation occurring throughout the length of distillation column 54 by the heat exchange medium passing in heat exchange relation lengthwise of the column in passages 76 and 86, and heat transfer along the column effected by the associated zones 70 and 80.

A crude liquid oxygen containing approximately 96% oxygen and about 2 to 3% argon, together with a very small amount of nitrogen, is withdrawn at 92 from the bottom of the main distillation zone 54, and at a temperature of about 89° K. is fed to the argon separation zone 80 where it is separated into pure liquid oxygen, e.g., containing about 99.5 to about 99.7% oxygen, which is withdrawn at 94 from the bottom of zone 80, and a crude argon fraction, approximately 40% argon, 40% nitrogen and 20% oxygen, which is withdrawn as vapor at 96 from the top of the argon separation column 80. The high purity oxygen liquid at 94 at a pressure of about 1.3 atmospheres is throttled slightly at 98 to a pressure of about 1.2 atmospheres and then is evaporated by passage in heat exchange relation through one or more passages 100 along the upper portion of the argon separation zone 80 to provide condensing duty to the argon distillation zone, and is withdrawn as vapor at 102, and passed through coil 104 of the main heat exchanger 26 to cool incoming compressed air feed streams at 24 and 58. The warmed high purity oxygen gas is taken off as product at 106. By utilizing the pressure build up in the main distillation zone, this permits J. T. throttling at 98 of the bottoms oxygen product at 94 from the argon separation zone 80, thus dropping the temperature of oxygen stream 94 sufficiently to allow it to evaporate at 100 and provide condensing duty for the argon separation zone.

Nitrogen vapor overhead at 74 from the intermediate pressure zone 70, at a pressure of about 3 atmospheres and a temperature of about 84° K., is combined at 108 with nitrogen vapor at 46 from the vapor-liquid separator 42, and is warmed by passage first through one or more passages at 110 in heat exchange relation with the high pressure separation zone 30 to provide additional condensing duty therein, and the exiting nitrogen stream at 112 is further warmed by passage through coil 114 of the main heat exchanger 26 in heat exchange relation with the compressed air streams at 24 and 58. The warmed exiting nitrogen vapor at 116, at a temperature of about 115° K., is fed to a work expander or turbine 118. The work expansion of the nitrogen vapor in turbine 118 generates required refrigeration in the system, and the energy derived from turbine 118 can be wasted or can be employed to power a generator indicated by dotted lines at 120. The cooled work expanded nitrogen stream 122 now cooled to about 98° K. and at about atmospheric pressure, is combined with nitrogen vapor overhead 124 withdrawn from the top of the main distillation zone 54, and previously passed through coil 52 of heat exchanger 50 for cooling reflux at 48 and through coil 66 of heat exchanger 64 for cooling intermediate pressure compressed air feed, and the combined nitrogen vapor is passed through coil 126 of the main heat exchanger 26 to cool the incoming compressed air feed streams.

The crude vapor mixture of argon, nitrogen and oxygen withdrawn at 96 from the top of the argon separation zone 80 is also passed through a coil 128 of the main heat exchanger 26 for cooling incoming compressed air feed streams.

It will be noted in the preferred process and system described above and illustrated in the drawing, that the oxygen-rich liquid air passing through heat exchange passages 76 and 86, the high purity oxygen passing through heat exchange passages 100 and the nitrogen vapor passing through heat exchange passages 110, are brought into heat exchange relation along the associated separation zones, effecting a non-adiabatic differential distillation throughout the various separation zones 30, 54, 70 and 80. In this manner, substantially greater efficiency is achieved and equilibrium between liquid and vapor is obtained substantially incrementally throughout the height of each of the separation zones 30, 54, 70 and 80, by adding heat along the lower portion of each of such zones and removing heat along the upper portion of each of such columns or zones. Such continuous incremental addition of heat to the lower portion of the column and continuous incremental removal of heat from the upper portion of the column effected by passing heat exchange fluid along the length of each column as noted above, effects a non-adiabatic differential distillation rather than the conventional fractional distillation, whereby equilibrium is much more closely approached throughout the column, thereby substantially increasing the efficiency of each of such separation zones or columns.

The heat exchanger passages or constructions 76, 86 100 and 110, for passage of the oxygen-rich liquid air, high purity oxygen and nitrogen vapor as heat exchange fluids, can be in the form of a plate-fin heat exchanger (not shown) arranged in heat exchange relation with channels bearing the liquid-vapor mixture being separated in the respective zones 30, 54, 70 and 80. Such channels may be constructed in the manner of a series of perforated fins, or plates, producing the effect of distillation column trays. This is a known type of heat exchanger arrangement described in International Advances in Cryogenics, volume 10, 1965. A heat exchanger arrangement or construction of this type is also disclosed in the copending application Ser. No. 572,135, filed Aug. 12, 1966, of James D. Yearout, now Pat. No. 3,508,412, and which is incorporated herein by reference. Since such heat exchanger arrangements or constructions per se form no part of the present invention, they are not shown herein. Although such a plate-fin type of heat exchanger arrangement is preferably employed, any other suitable form of heat exchanger apparatus can be employed in providing the unit 78 containing the separation zones 30, 54, 70 and 80, positioned in indirect heat exchange relation with the passages 76, 86, 100 and 110, as described above and shown in the drawing, so as to effect the above-described differential distillation in the respective zones of unit 78.

It will be understood that the system described above including the temperatures and pressures set forth are only illustrative and are not intended as limitative of the invention.

Although in preferred practice, for obtaining highest efficiency as described above, the respective high and intermediate pressure separation zones 30 and 70, the main distillation zone 54 and the argon separation zone 80 are associated in heat exchange relation, in conjunction with the heat exchange passages 76, 86, 100 and 110, to effect a non-adiabatic differential distillation, the high pressure separation zone 30, the intermediate pressure zone 70, and the argon separation zone 80 can be separate columns disassociated from heat exchange relation with the main distillation zone 54, and employed as conventional separate columns in the system, with heat exchange fluids passed in conventional manner transversely through the upper and lower portions of the respective columns to supply reboiling and condensing duty for these columns. However, this type of operation is not preferred.

In the system described above and illustrated in the drawing, it will be noted, of particular significance, that a substantial portion of the air feed, e.g., about one-third, is relatively low pressure feed, e.g., about 2½ to about 3 atmospheres, and is fed through a system 70 similar to the high pressure separation system at 30, but operating at a lower pressure. The oxygen-rich liquid air streams withdrawn from the high pressure and intermediate pressure separation zones 30 and 70 are subcooled in passages 86 against the main distillation column 54, which absorbs heat both from passages 86 and the intermediate pressure zone 70. The overhead nitrogen at 74 withdrawn from the intermediate pressure zone is heated in passages 110 and 114 and expanded to provide refrigeration in the system.

Again referring to the drawing, instead of subcooling the oxygen-rich liquid air removed at 36 and 72 in passages 76 and 86, such mixtures can be subcooled in a conventional heat exchanger, and then introduced at suitably reduced pressure as feed into the main distillation zone 54. Also, as previously noted, such subcooling can be entirely omitted, and the oxygen-rich liquid air mixtures at 36 and 72, after suitable throttling to the pressure in the main distillation zone 54, can be introduced therein as feed. Under these conditions, the system shown in the drawing can be modified to eliminate passages 76 and 86, with zones 30, 80, 54 and 70 being maintained in associated heat exchange relation, as illustrated in the drawing.

The vapor-liquid separator 42 is employed to recover the flash nitrogen vapor at 46 and by combining same with the overhead nitrogen at 74, to augment the flow of nitrogen vapor to the expansion turbine 118. However, if desired, the vapor-liquid separator 42 can be omitted and all of the liquid nitrogen withdrawn from the high pressure separation zone at 32, and suitably throttled at 56, can be employed as reflux in the main distillation zone 54. When employing the separator 42, the major portion of the nitrogen therein is withdrawn as liquid at 44 and employed as reflux in column 54.

It will also be seen from the drawing that in the upper half of the argon separation zone 80, the condensing duty is obtained therein by supplying reboil heat to the bottom of the main distillation zone 54, and from the high purity oxygen vaporized in passages 100, and the reboil heat required in the lower portion of the argon separation zone 80 is furnished by providing condensing duty to the high pressure separation zone 30.

From the foregoing, it is seen that the invention provides a novel method and system for producing high purity oxygen product, employing an air feed wherein only a portion of the air feed is required to be compressed to relatively high pressures of the order of 6 or 7 atmospheres, a substantial portion of the air feed being employed at an intermediate or reduced pressure, thereby substantially reducing the cost of operation of the system, and preferably employing a highly efficient rectification system, involving the use of non-adiabatic differential distillation, and wherein high pressure nitrogen removed as overhead from the high pressure zone is employed as reflux to the main distillation zone, and intermediate pressure nitrogen overhead withdrawn from the intermediate pressure zone is work-expanded to provide required refrigeration for the system.

While I have described particular embodiments of my invention for the purpose of illustration, it should be understood that various additional modifications and adaptations thereof may be made within the spirit of the invention, and within the scope of the appended claims.

I claim:

1. In a process for the separation of high purity oxygen from air, the steps which comprise providing two compressed air feed streams, a first air stream being a relatively high pressure stream and a second being an intermediate pressure stream, cooling each of said compressed air feed streams approximately to their respective saturation temperatures, introducing said first compressed air stream into a first high pressure separation zone in the form of a first fractionating column, removing high pressure nitrogen as overhead from said zone, reducing the pressure of said overhead nitrogen and introducing at least a portion of said overhead nitrogen as reflux to a main distillation zone in the form of a main distillation column at a pressure somewhat above atmospheric, introducing said second compressed air stream into a second intermediate pressure separation zone in the form of a second fractionating column, removing nitrogen as overhead from said last-mentioned zone, work expanding said last mentioned nitrogen overhead, passing the resulting cooled expanded nitrogen into heat exchange relation with said compressed air feed for cooling same as aforesaid, withdrawing a first oxygen-rich liquid air mixture from said first high pressure separation zone, withdrawing a second oxygen-rich liquid air mixture from said second intermediate pressure separation zone, reducing the pressure of said first and second liquid mixtures, introducing the resulting oxygen-rich air mixtures as feed into said main distillation zone, withdrawing nitrogen overhead from said main distillation zone, withdrawing crude liquid oxygen containing a minor portion of argon from the bottom of said main distillation zone, and separating argon and removing high purity oxygen from said crude liquid oxygen in an argon separation zone in the form of a third fractionating column, said main distillation zone, and said high pressure, intermediate pressure and argon separation zones being attached in side-by-side indirect heat exchange relation along said zones, to provide the requisite condensing and reboiling duty for each of said zones, including passing said first oxygen-rich liquid air mixture and said second oxygen-rich liquid air mixture into indirect heat exchange relation along the length of said zones for subcooling said first and second oxygen-rich liquid air mixtures prior to introduction of said oxygen-rich air mixtures as feed into said main distillation zone.

2. The method as defined in claim 1, said high pressure separation zone being located in indirect heat exchange relation with and along the lower portion of said argon separation zone, the upper portion of said argon separation zone being located in indirect heat exchange relation with and along the lower portion of said main distillation zone, and said intermediate pressure zone being located in indirect heat exchange relation with and along the upper portion of said main distillation zone, which includes passing said first oxygen-rich liquid air mixture removed from said high pressure separation zone in indirect heat exchange relation along the length of said high pressure separation zone, along the entire length of said argon separation zone and along the entire length of said main distillation zone, and passing said second oxygen-rich liquid air mixture withdrawn from said intermediate pressure zone in indirect heat exchange relation along the entire length of said intermediate pressure zone and along the length of the upper portion of the main distillation zone, for subcooling said oxygen-rich liquid air mixtures prior to introduction thereof as feed into said main distillation zone, and effecting a non-adiabatic differential distillation in said zones.

3. The method as defined in claim 2, wherein said first high-pressure oxygen-rich liquid mixture is throttled to a pressure approximating the pressure of said intermediate pressure zone, after passage of said first oxygen-rich liquid air mixture into heat exchange relation along the length of said argon separation zone and along the lower portion of said main distillation zone, and wherein said second intermediate pressure oxygen-rich liquid air mixture is then combined with said throttled first oxygen-rich liquid air mixture, and said combined oxygen-rich liquid air mixture passed in heat exchange relation along the length of said intermediate pressure zone and along the length of the upper portion of said main distillation zone, and said combined oxygen-rich liquid air mixture throttled prior to introduction thereof as feed into the main distillation zone.

4. The method as defined in claim 1, which includes separating said high pressure nitrogen overhead from said high pressure separation zone into liquid and vapor nitrogen, the major portion of said separated nitrogen being in liquid form, further cooling said separated liquid nitrogen and throttling same prior to introduction thereof into said main distillation zone, and combining said separated nitrogen vapor with overhead nitrogen from said intermediate pressure zone, and warming said combined nitrogen prior to work expansion thereof to provide refrigeration.

5. The method as defined in claim 1, including passing cold nitrogen overhead from said intermediate pressure separation zone into heat exchange relation along said high pressure separation zone and then into heat exchange relation with said compressed air feed streams for cooling same, to thus warm said nitrogen stream prior to work expansion thereof.

6. The method as defined in claim 1, which includes throttling said high purity oxygen liquid withdrawn from said argon separation zone, to a somewhat lower pressure and passing the resulting high purity oxygen in heat exchange relation along the upper portion of said argon separation zone to vaporize said liquid oxygen and providing additional condensing duty therein.

7. The method as defined in claim 3, which includes passing the cold nitrogen overhead withdrawn from the intermediate pressure separation zone into heat exchange relation along said high pressure separation zone to provide condensing duty therein, and then passing the resulting nitrogen vapor into heat exchange relation with compressed air feed for cooling same, to thus warm said nitrogen stream prior to work expansion thereof, and including throttling said high purity oxygen liquid withdrawn from the argon separation zone to a somewhat lower pressure and passing said throttled oxygen into heat exchange relation along the upper portion of said argon separation zone to vaporize said liquid oxygen and provide additional condensing duty in said last-mentioned zone.

8. The method as defined in claim 1 wherein said high purity oxygen vapor, said overhead nitrogen stream from said main distillation zone, and the overhead argon vapor separated in said argon separation zone are passed in heat exchange relation with said compressed air feed for cooling same.

9. A system for the separation of high purity oxygen from air, including means forming a high pressure separation zone, an intermediate pressure separation zone, a main distillation zone, and an argon separation zone, each of said zones being in the form of a fractionating column, means providing a high pressure air feed stream, means providing an intermediate pressure air feed stream, means for cooling each of said compressed air feed streams to saturation, means for introducing said cooled high pressure air stream into said high pressure separation zone to effect separation therein into a high pressure nitrogen overhead and a high pressure oxygen-rich liquid air mixture, means for reducing the pressure of the overhead nitrogen from said high pressure separation zone and introducing same as reflux to said main distillation zone, means for introducing said cooled intermediate pressure air stream into said intermediate pressure separation zone, and effecting a separation therein of nitrogen as overhead and an intermediate pressure oxygen-rich liquid air mixture, an expander, means for removing said nitrogen overhead from said intermediate pressure separation zone, means for warming said nitrogen overhead, means to conduct said warmed nitrogen to said expander for work expansion of said nitrogen to provide refrigeration, means for passing the resulting expanded cooled nitrogen into heat exchange relation with said compressed air streams for cooling same as aforesaid, means for withdrawing said high pressure oxygen-rich liquid air mixture from said high pressure separation zone, means for withdrawing said intermediate pressure oxygen-rich liquid air mixture from said intermediate pressure separation zone, means for reducing the pressure of said oxygen-rich liquid air mixtures, means for introducing the resulting oxygen-rich liquid air mixtures as feed into said main distillation zone, and effecting a separation therein of nitrogen as overhead and crude liquid oxygen, means for withdrawing said last mentioned nitrogen overhead, means for withdrawing said crude liquid oxygen and containing a minor portion of argon from said main distillation zone, and for introducing same into said argon separation zone, and effecting a separation therein of argon-containing vapor as overhead and high purity liquid oxygen, and means for removing said high purity liquid oxygen, said main distillation zone, said high pressure and intermediate pressure separation zones, and said argon separation zone being attached in side-by-side indirect heat exchange relation along said zones, said high pressure separation zone being in indirect heat exchange relation with and along the lower portion of said argon separation zone, the upper portion of said argon separation zone being in indirect heat exchange relation with and along the lower portion of said main distillation zone, and said intermediate pressure zone being in indirect heat exchange relation with and along the upper portion of said main distillation zone, thereby providing requisite reboiling and condensing duty in said zones, and means for passng said high pressure oxygen-rich liquid air mixture and said intermediate pressure oxygen-rich liquid air mixture into indirect heat exchange relation along the length of said zones for subcooling said oxygen-rich liquid air mixtures prior to introduction of said mixtures as feed into said main distillation zone.

10. A system as defined in claim 9, comprising means for subcooling said high pressure and said intermediate pressure oxygen-rich liquid air mixtures, said subcooling means including means for passing said high pressure oxygen-rich liquid air mixture in heat exchange relation along the length of the upper portion of said high pressure separation zone, along the entire length of said argon separation zone and along the length of the lower portion of said main distillation zone, throttling means in communication with the discharge end of said last mentioned heat exchange means, means for combining said intermediate pressure oxygen-rich liquid air mixture with said throttled high pressure oxygen-rich liquid air mixture, means for passing said combined oxygen-rich liquid air mixture in heat exchange relation along the entire length of said intermediate pressure separation zone and along the upper portion of said main distillation zone.

11. The system as defined in claim 9, including means for passing the nitrogen overhead from said intermediate pressure zone in heat exchange relation along the length of said high pressure separation zone to provide condensing duty therein and warming said overhead nitrogen, and means for passing said warmed nitrogen into heat exchange relation with said compressed air feed streams for cooling same, and to further warm said overhead nitrogen prior to expansion thereof in said expander, and including means for throttling high purity liquid oxygen withdrawn from said argon separation zone to reduce the pressure thereof and means for passing said throttled high purity oxygen in heat exchange relation along the length of the upper portion of said argon separation zone to supply additional condensing duty by vaporization of said high purity liquid oxygen.

References Cited
UNITED STATES PATENTS

| | | | |
|---|---|---|---|
| 1,257,470 | 2/1918 | Filippo et al. | 62—22 |
| 1,800,353 | 4/1931 | Messer. | |
| 1,959,884 | 5/1934 | Van Nuys | 62—30 |
| 2,122,238 | 6/1938 | Pollitzer. | |
| 2,620,637 | 12/1952 | Schilling | 62—26 |
| 2,713,781 | 7/1955 | Williams. | |
| 2,760,351 | 8/1956 | Schilling. | |
| 2,779,174 | 1/1957 | Vesque | 62—22 |
| 2,822,675 | 2/1958 | Grenier | 62—30 |
| 3,034,306 | 5/1962 | Schuffan et al. | 62—30 |
| 3,083,545 | 4/1963 | Grossmann | 62—31 |
| 3,222,878 | 12/1965 | Becker | 62—30 |
| 3,257,814 | 6/1966 | Carbonell | 62—13 |
| 3,258,930 | 7/1966 | Jakob | 62—13 |
| 3,264,831 | 8/1966 | Jakob | 62—13 |
| 3,392,536 | 7/1968 | Smith | 62—30 |

WILBUR L. BASCOMB, Jr., Primary Examiner

U.S. Cl. X.R.

62—25, 29, 31, 39